Patented Mar. 31, 1942

2,278,202

UNITED STATES PATENT OFFICE 2,278,202

MANUFACTURE OF 3-ARYL-AMINOTETRA-HYDROFURANES

Hans Lange, Dessau, Anhalt, Germany, assignor to General Aniline & Film Corporation, a corporation of Delaware No Drawing. Application September 6, 1939, Serial No. 293,618. In Germany September 19, 1938

8 Claims. (Cl. 260—345)

The present invention relates to a process for manufacturing 3-arylaminotetrahydrofuranes in which the aryl radicle belongs to the benzene series.

A further object of the invention is the new products obtainable according to this process.

Pyrrolidine derivatives can be made from tetrahydrofurane or 1.4-butanediol, the internal anhydride of which is tetrahydrofurane, by subjecting tetrahydrofurane together with a primary amine at a raised temperature to the action of a catalyst that removes water, or by heating to a raised temperature 1.4-butanediol or tetrahydrofurane with ammonia or a primary amine in the presence of a salt of the corresponding base. If the 3-chlorotetrahydrofurane is heated in the manner described above with an aromatic amine an extensive resinification of the product occurs; a chlorinated pyrrolidine derivative is not produced.

According to the present invention 3-arylaminotetrahydrofuranes are obtained by subjecting to a heat treatment a mixture of 3-chlorotetrahydrofurane and a primary aromatic amine of the benzene series, the latter suitably used in excess or with the addition of a tertiary amine, in the presence of a small quantity of a salt of the primary aromatic amine. For about 1 mol of 3-chlorotetrahydrofurane there are preferably used about 2.2 mols of the selected amine. During this reaction the chlorine atom is exchanged and not the oxygen of the tetrahydrofurane ring. By the hitherto usual and known methods, namely treatment with sodium carbonate, sodium acetate, alcoholic caustic potash solution or the like, the exchange of chlorine does not occur or at most occurs in traces.

The hitherto unknown 3-arylaminotetrahydrofuranes are valuable intermediate products for use in the manufacture of dyes.

The following examples illustrate the invention, the parts being by weight:

*Example 1.*—A mixture of 53.5 parts of 3-chlorotetrahydrofurane, 47 parts of aniline, 78 parts of diethylaniline and 0.5 part aniline hydrochloride is heated for 24 hours to about 150° C. to 165° C. After cooling, the product of the reaction is rendered alkaline with sodium carbonate solution and then extracted with ether. An oil is obtained which by distillation under reduced pressure yields 26 parts of 3-phenyl-aminotetrahydrofurane (= 31 per cent of the theoretical yield) boiling at 150° C. to 151° C. under a pressure of 11 mm. of mercury.

*Example 2.*—A mixture of 53.5 parts of 3-chlorotetrahydrofurane, 130 parts of meta-toluidine and 1 part of meta-toluidine hydrochloride is heated for about 18 hours at 150° C. to 170° C. After cooling the product of the reaction is rendered alkaline with caustic soda solution and then extracted with ether. By distillation under reduced pressure there are obtained 35 parts of 3-meta-tolylaminotetrahydrofurane (= 40 per cent. of the theoretical yield) boiling at 160° C. to 161° C. under a pressure of 11 mm. of mercury.

In a completely analogous manner there may be produced 3-meta-chlorophenylaminotetrahydrofurane when subjecting meta-chloraniline and 3-chlorotetrahydrofurane to the said reaction.

It is obvious that my invention is not limited to the foregoing examples or to the specific details given therein. Thus, for instance, other amines of the benzene series may be condensed with 3-chlorotetrahydrofurane in the manner described. The reaction temperature indicated in the examples with about 150° C. to about 170° C., likewise may be varied in certain limits. As may be seen from the examples there is either used a suitable excess of the aromatic amine over that required theoretically or a tertiary amine is added in order to bind the hydrochloric acid evolved during the reaction. Here likewise some variations are possible and a few simple comparative experiments should be made to determine the best reaction temperature and the best kind and the most suitable amount of acid binding amine which is to be reacted with 3-chlorotetrahydrofurane. All these possibilities are intended to be within the scope of the claims following hereafter.

What I claim is:

1. The process which comprises heating 3-chloro-tetrahydrofurane with a primary monocyclic arylamine in excess over the amount required theoretically by the equation:

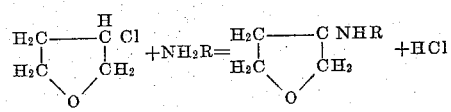

wherein R means a monocyclic aryl radical, and in the presence of a salt of the primary monocyclic arylamine to reaction temperature.

2. The process which comprises heating about 1 mol of 3-chlorotetrahydrofurane with about 2.2 mols of a primary monocyclic arylamine to reaction temperature in the presence of a salt of the primary aromatic amine.

3. The process which comprises heating 3-chlorotetrahydrofurane with a primary monocylic arylamine sufficient to bind the hydrochloric acid set free during the suction to reaction temperature in the presence of a salt of the primary aromatic amine and of a tertiary amine.

4. The process which comprises heating to reaction temperature a mixture containing in about molecular proportions 3-chlorotetrahydrofurane, aniline, and diethylaniline and a small amount of aniline hydrochloride.

5. The process which comprises heating to reaction temperature a mixture containing 1 mol 3-chlorotetrahydrofurane, about 2.2 mols of meta-toluidine and a small amount of meta-toluidine hydrochloride.

6. 3-phenylaminotetrahydrofurane boiling at 150° C. to 151° C. under a pressure of 11 mm. of mercury.

7. 3-meta-tolylaminotetrahydrofurane boiling at 160° C. to 161° C. under a pressure of 11 mm of mercury.

8. 3-arylamino-tetrahydrofurane of the general formula

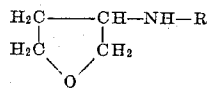

wherein R is a monocyclic aryl radical.

HANS LANGE.